United States Patent
Xu et al.

(10) Patent No.: US 9,128,252 B2
(45) Date of Patent: Sep. 8, 2015

(54) OPTICAL SWITCH USING OPTICAL FIBERS

(71) Applicant: The Boeing Company, Chicago, IL (US)

(72) Inventors: Yuanjian Xu, Thousand Oaks, CA (US); Terry Lee Holcomb, Torrance, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/244,893

(22) Filed: Apr. 3, 2014

(65) Prior Publication Data
US 2015/0205049 A1 Jul. 23, 2015

Related U.S. Application Data

(62) Division of application No. 12/508,837, filed on Jul. 24, 2009, now abandoned.

(51) Int. Cl.
*G02B 6/35* (2006.01)
*G02B 23/24* (2006.01)

(52) U.S. Cl.
CPC .......... *G02B 6/3572* (2013.01); *G02B 23/2469* (2013.01)

(58) Field of Classification Search
None
See application file for complete search history.

(56) References Cited

U.S. PATENT DOCUMENTS

| 4,931,076 A | 6/1990 | Berkey |
| 6,169,826 B1 | 1/2001 | Nishiyama et al. |
| 6,272,268 B1 | 8/2001 | Miller et al. |
| 6,366,714 B1 | 4/2002 | DeBoynton et al. |
| 6,959,131 B2 | 10/2005 | Willig |

OTHER PUBLICATIONS

Snyder, "Coupled-mode Theory for optical fibers", Journal of the Optical Society of America, vol. 62, No. 11, Nov. 1972, pp. 1267-1277.
McIntyre et al., "Power transfer between optical fibers", Journal of the Optical Society of America, vol. 63, No. 12, Dec. 1973, pp. 1518-1527.
Kelly et al., "Robust evanescent fused tapered couplers", Electronics Letters, Feb. 2004, vol. 40, No. 4, pp. 1-2.

*Primary Examiner* — Ryan Lepisto
*Assistant Examiner* — Erin Chiem
(74) *Attorney, Agent, or Firm* — Yee & Associates, P.C.

(57) ABSTRACT

A method and apparatus for routing light signals. A light signal is sent into a first optical fiber core in an optical coupler having an input region, a coupling region, and an output region. The first optical fiber core is located in a cladding having a substantially circular cross section. The light signal is coupled between the first optical fiber core and one of the first optical fiber core and a second optical fiber core in the coupling region of the optical coupler based on a position of the coupling region as the light signal travels through the coupling region to the output region of the optical coupler using a switching system configured to move the coupling region between one of a first position and a second position.

20 Claims, 5 Drawing Sheets

OPTICAL SWITCH USING OPTICAL FIBERS

This application is a divisional application of U.S. patent application Ser. No. 12/508,837, filed Jul. 24, 2009.

BACKGROUND INFORMATION

1. Field

The present disclosure relates generally to routing light signals in optical fibers and, in particular, to optical switches. Still more particularly, the present disclosure relates to a method and apparatus for switching light signals from one optical fiber to another optical fiber using an optical coupler.

2. Background

Fiber optic communications systems are used to transmit information within different types of communications networks. Fiber optic communications systems are comprised of a number of different components. The number of different components may include, for example, optical fibers, optical switches, and/or other suitable components. Optical fibers provide a path through which a light signal may travel. An optical fiber may be comprised of a fiber jacket, a cladding, and an optical fiber core. The fiber jacket may be comprised of a material such as, for example, acrylate, plastic, and/or some other suitable material. The optical fiber core may be comprised of glass. The light signal travels through the optical fiber core.

Optical switches may be used to change the path through which a light signal travels from one optical fiber to another optical fiber. Optical fibers and optical switches are used to transmit information in the form of light signals to a desired destination.

Optical switches are also used to increase the reliability of fiber optic communications systems. For example, optical switches allow the use of redundant subsystems within fiber optic communications systems. In addition, optical switches are used to include and/or bypass particular subsystems within fiber optic communications systems. These subsystems may be, for example, any type of functional unit and/or component within the fiber optic communications system.

A number of different types of optical switches with a number of different configurations are currently used for routing light signals. In one configuration for an optical switch, a light signal is sent out of a first optical fiber, routed to a desired location, and then coupled into a second optical fiber. With these types of optical switches, physical discontinuity is present between the first and second optical fibers. This physical discontinuity may result in optical power loss. This optical power loss may range from around several tenths of a decibel to greater than several decibels. Further, these types of optical switches have glass-air interfaces that are subject to contamination and/or damage when operating at high optical power levels.

Therefore, it would be advantageous to have a method and apparatus that takes into account at least some of the issues discussed above, and possibly other issues.

SUMMARY

In one advantageous embodiment, an apparatus comprises optical fibers, an optical coupler, and a switching system. The optical coupler has an output region, an input region, and a coupling region between the output region and the input region. Optical fiber cores in the coupling region are located in a cladding having a substantially circular cross section. The switching system is configured to move the coupling region in a manner that causes a light signal entering an optical fiber core in the optical coupler in the input region to couple between the optical fiber core and one of the optical fiber cores in the optical coupler based on a position of the coupling region as the light signal travels through the coupling region to the output region of the optical coupler.

In another advantageous embodiment, an optical switch comprises an optical coupler, a magnetic field generation unit, and a flexing member. The optical coupler has an output region, an input region, and a coupling region between the output region and the input region. A first optical fiber core and a second optical fiber core in the coupling region are located in a cladding having a substantially circular cross section. The magnetic field generation unit is configured to move the coupling region in a manner that causes a light signal entering one of the first optical fiber core and the second optical fiber core in the optical coupler in the input region to couple to the other of the first optical fiber core and the second optical fiber core in the optical coupler based on a position of the coupling region as the light signal travels through the coupling region to the output region of the optical coupler. The flexing member is configured to hold the coupling region within the flexing member. The magnetic field generation unit has a number of permanent magnets configured to move the flexing member between a first position and a second position by the magnetic field.

In yet another advantageous embodiment, a method is present for routing light signals. A light signal is sent into a first optical fiber core in an optical coupler having an input region, a coupling region, and an output region. The first optical fiber core is located in a cladding having a substantially circular cross section. The light signal in the first optical fiber core is coupled between the first optical fiber core and a second optical fiber core in the coupling region of the optical coupler as the light signal travels through the coupling region to the output region of the optical coupler using a switching system configured to move the coupling region between one of a first position and a second position.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize that a number of currently available optical switches may not be capable of operating at high optical power levels without degradation of the components of the optical switches. For example, operation at high optical power levels may cause optical inconsistencies at the fiber-air interface. These inconsistencies may include, without limitation, optical damage, optical degradation, and/or micro-cracks. The different advantageous embodiments recognize that having an optical switch that operates at high optical power levels with low optical loss is desirable. A high optical power level may be a power level greater than around 0.5 watts.

The different advantageous embodiments also take into account and recognize that some currently used fiber couplers have dumbbell-shaped cross sections. The size of the cross section of the coupling region of these types of fiber couplers may not allow these types of couplers to be flexed repeatedly without breaking. Glass capillaries may be used to encapsulate the coupling region and increase the size of the cross section of the coupling region. By increasing the size of the cross section of the coupling region, the glass capillary and the coupling region in the glass capillary may be flexed without breaking.

The different advantageous embodiments recognize that fabricating glass capillaries that encapsulate fiber couplers involves a greater number of fabrication steps than desired.

Thus, the different advantageous embodiments provide a method and apparatus for switching light signals. In one advantageous embodiment, an optical switch comprises an optical coupler and a switching system. The optical coupler has an output region, an input region, and a coupling region between the output region and the input region. Optical fiber cores in the coupling region are located in a cladding having a substantially circular cross section.

The switching system is configured to move the coupling region in a manner that causes a light signal entering a first optical fiber core in the optical coupler in the input region to couple between the first optical fiber core and one of the first optical fiber core and a second optical fiber core in the optical coupler. This coupling is based on a position of the coupling region as the light signal travels through the coupling region to the output region of the optical coupler.

In these different advantageous embodiments, the cladding with the substantially circular cross section is in contrast to the current systems that use optical fibers with claddings that form a dumbbell-shaped cross section.

Figure 1:
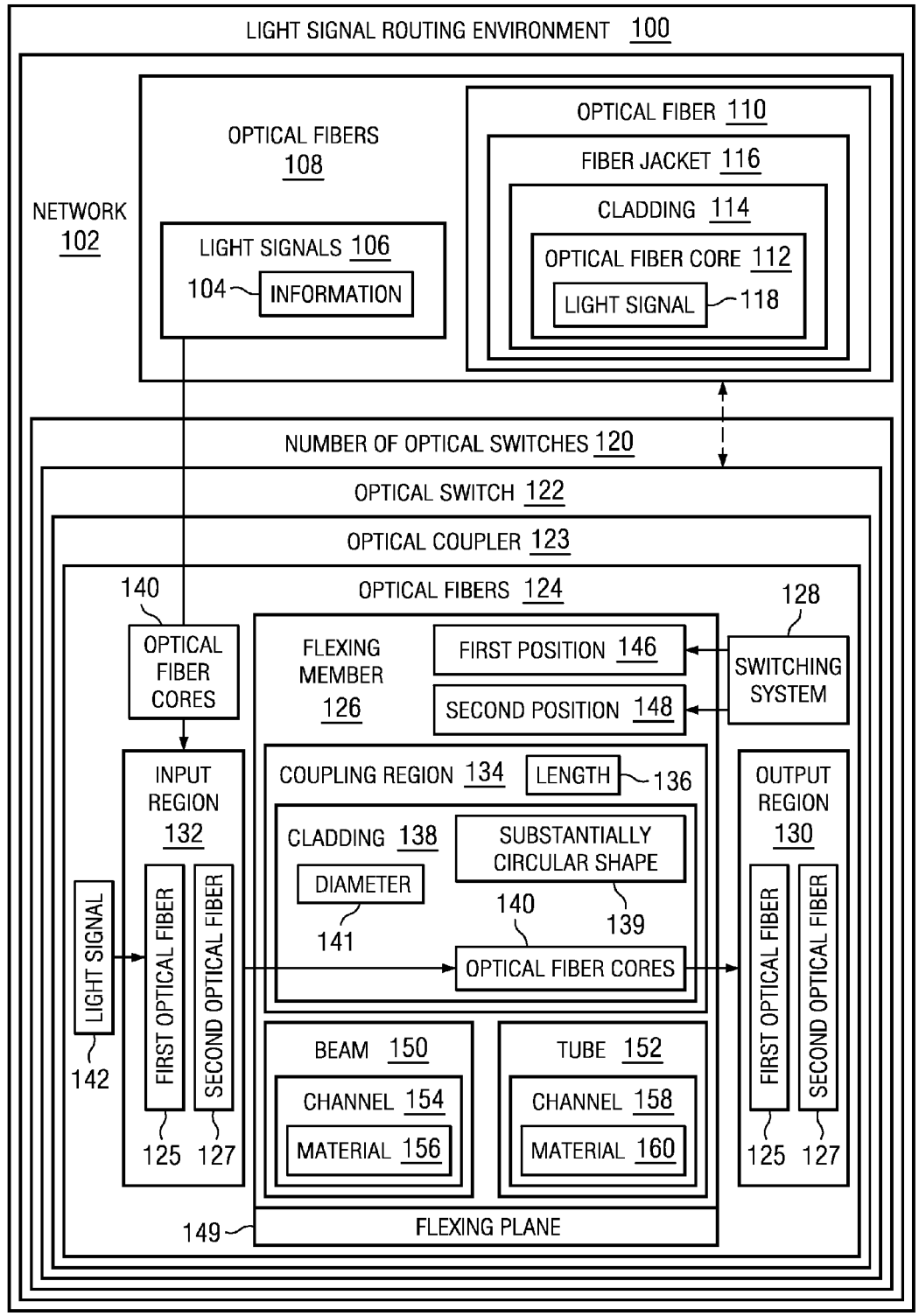
FIG. 1 is an illustration of a light signal routing environment in which an advantageous embodiment may be implemented.

With reference now to the figures and, in particular, with reference to FIG. 1, an illustration of a light signal routing environment is depicted in accordance with an advantageous embodiment. In this illustrative example, light signal routing environment 100 includes network 102. Network 102 carries information 104 in light signals 106. Light signals 106 travel over optical fibers 108 within network 102. For example, optical fiber 110 in optical fibers 108 have optical fiber core 112, cladding 114, and fiber jacket 116. Optical fiber core 112 carries light signal 118. Light signal 118 is one example of light signals 106.

Optical fiber 110 may be, for example, without limitation, a standard single mode optical fiber, a polarization maintaining single mode optical fiber, and/or some other suitable type of fiber that is capable of carrying light along the length of optical fiber 110. Cladding 114 encompasses optical fiber core 112. In these examples, cladding 114 may be formed from a material and/or layers of materials. Further, cladding 114 may be formed from a material that has a varying refractive index. The material and/or layers of materials for cladding 114 may have a lower refractive index than optical fiber core 112. Cladding 114 may provide protection for optical fiber core 112.

Further, optical fiber 110 also may have fiber jacket 116. Fiber jacket 116 is formed around cladding 114 and may provide additional protection for optical fiber core 112. Fiber jacket 116 may be formed from a material such as, for example, without limitation, an acrylate, a plastic, a polymer, and/or some other suitable material. In some cases, this configuration of optical fiber 110 may be referred to as an optical fiber cable.

Number of optical switches 120 may be used to route light signals 106 through optical fibers 108 within network 102. For example, optical switch 122 is an example of an optical switch within number of optical switches 120. Optical switch 122 comprises optical coupler 123 with optical fibers 124, flexing member 126, and switching system 128 in this illustrative example.

Optical fibers 124 in optical switch 122 have output region 130, input region 132, and coupling region 134. Coupling region 134 is located between output region 130 and input region 132. Light signals 106 may enter input region 132 and be switched between different optical fibers within optical fibers 124 in coupling region 134 for further transmission to output region 130 in these illustrative examples.

Length 136 of coupling region 134 has cladding 138. In coupling region 134, the individual claddings of optical fibers 124 are heated to form a single common cladding for cladding 138. Cladding 138 has substantially circular shape 139.

This configuration of optical coupler 123 is different from currently used configurations in which couplers couple light signals to different fibers for switching. Some currently used configurations may have claddings that adhere to each other or are partially melted to each other but not formed into substantially circular shape 139 as with cladding 138.

Cladding 138 may have diameter 141 for substantially circular shape 139. Diameter 141 may have a size that provides a desired strength for coupling region 134. This strength may be selected to allow coupling region 134 to resist breaking upon bending of coupling region 134.

In this example, flexing member 126 is configured to hold coupling region 134 within flexing member 126. In these illustrative examples, flexing member 126 holds substantially all of coupling region 134. In other advantageous embodiments, flexing member 126 may hold all of coupling region 134 in addition to at least a portion of optical coupler 123 outside of coupling region 134. In this illustrative example, flexing member 126 may be, for example, without limitation, beam 150, tube 152, and/or some other suitable structure. Flexing member 126 is flexible in these examples.

In these different advantageous embodiments, optical fibers 124 include first optical fiber 125 and second optical fiber 127. Switching system 128 is configured to move flexing member 126 in a manner that causes an input, such as light signal 142, entering first optical fiber 125 in optical coupler 123 in input region 132 to couple between one of first optical fiber 125 and second optical fiber 127.

The coupling of light signal 142 is based on whether flexing member 126 is in first position 146 or second position 148 as light signal 142 travels through coupling region 134 to output region 130 in optical coupler 123. First position 146 and second position 148 are positions in which switching system 128 may move flexing member 126 in this example.

Flexing member 126 may be configured to hold coupling region 134 to allow coupling region 134 to move between first position 146 and second position 148. This movement may be substantially within flexing plane 149. Flexing plane 149 is the plane containing optical fiber cores 140 within optical fibers 124. Movement of coupling region 134 substantially in flexing plane 149 allows a desired amount of coupling to occur. As coupling region 134 moves further outside of flexing plane 149, the amount of coupling that occurs may decrease. A decreased amount of coupling leads to incomplete switching of light signal 142.

In this illustrative example, optical coupler 123 is manufactured with optical fibers 124 positioned substantially parallel to each other. This position may allow coupling region 134 to move substantially within flexing plane 149. In other words, bending and/or twisting of optical fibers 124 around each other during manufacturing of optical fibers 124 is avoided in these illustrative examples. More specifically, optical fibers 124 may be positioned parallel to each other during the manufacturing of optical coupler 123.

When flexing member 126 takes the form of beam 150, substantially all of coupling region 134 may be located in channel 154 in beam 150 in this illustrative example. Material 156 may hold coupling region 134 within channel 154.

In a similar fashion, when tube 152 is present, substantially all of coupling region 134 may extend through channel 158 within tube 152. Additionally, material 160 may be present within channel 158 to hold coupling region 134 within channel 158. The material may be, for example, without limitation, a polycarbonate, an acrylate, an adhesive, and/or some other suitable material. A suitable material may be a material capable of holding coupling region 134 within channel 154 in beam 150 and/or channel 158 in tube 152.

The illustration of light signal routing environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, a magnetic material may be attached to and/or coated to one end of flexing member 126. Switching system 128 may generate a magnetic field to move flexing member 126 and coupling region 134 in flexing member 126 between one of first position 146 and second position 148 to couple light signal 142 to different optical fibers in optical coupler 123. In these illustrative examples, the magnetic field may move flexing member 126 and coupling region 134 to one of two predetermined positions to couple light signal 142.

In yet other advantageous embodiments, switching system 128 may be a mechanical switch physically moving coupling region 134 and/or flexing member 126. Also, flexing member 126 may take various forms, depending on the particular implementation.

In other advantageous embodiments, optical switch 122 may be a polarization maintaining optical switch with polarization maintaining optical fibers for optical fibers 124. In these examples, a polarization maintaining optical fiber is an optical fiber in which the polarization of a light signal is maintained during propagation of the light signal through the optical fiber.

Figure 2:
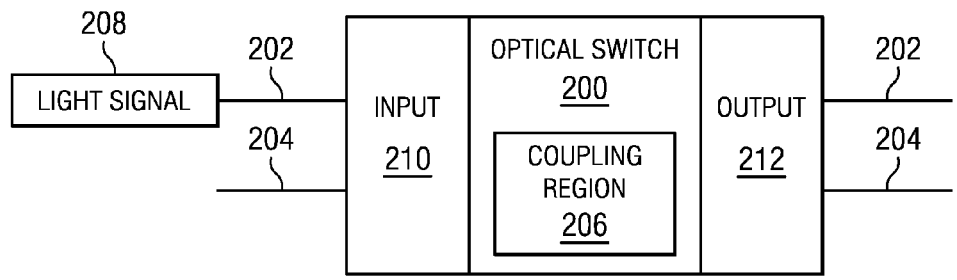
FIG. 2 is an illustration of an optical switch in accordance with an advantageous embodiment.

With reference now to the FIG. 2, an illustration of an optical switch is depicted in accordance with an advantageous embodiment. In this illustrative example, optical switch 200 is an example of one implementation for optical switch 122 in FIG. 1. Further, optical switch 200 is a 2×2 optical switch with two input ports and two output ports in this illustrative example.

As depicted, optical switch 200 includes optical fiber 202 and optical fiber 204. In other advantageous embodiments, optical switch 200 may include a different number of optical fibers for a different number of input or output ports. For example, without limitation, optical switch 200 may be a 1×2 switch or a 2×1 switch. A 1×2 optical switch includes one input optical fiber. A 2×1 optical switch includes one output optical fiber.

Light signal 208 enters optical switch 200 at input 210 through an optical fiber, such as optical fiber 202, in this example. Optical switch 200 is configured to couple light signal 208 to one of optical fiber 202 and optical fiber 204. In these examples, coupling means that a desired amount of light signal 208 is transferred from the current optical fiber to another optical fiber in coupling region 206 within optical switch 200. The desired amount of light signal 208 may be substantially all of light signal 208 in these examples. In other words, light signal 208 may be sent as input through optical fiber 202 at input 210 of optical switch 200 and then as output through optical fiber 202 or optical fiber 204 at output 212, depending on the state of optical switch 200.

Figure 3:
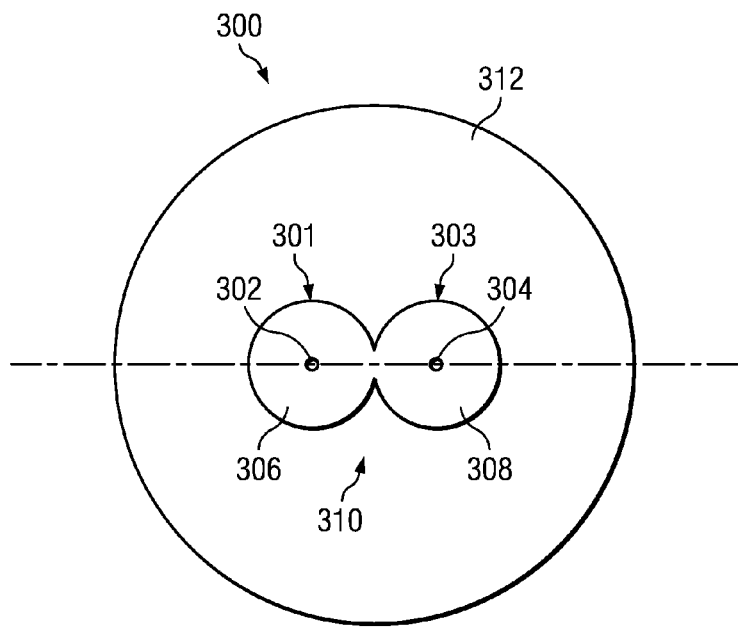
FIG. 3 is an illustration of a known cross section of a coupling region for an optical switch in accordance with an advantageous embodiment.

Turning now to FIG. 3, an illustration of a known cross section of a coupling region for an optical switch is depicted in accordance with an advantageous embodiment. In this illustrative example, coupling region 300 has optical fiber 301 with optical fiber core 302 and optical fiber 303 with optical fiber core 304. Further, optical fiber 301 has cladding 306 surrounding optical fiber core 302, and optical fiber 303 has cladding 308 surrounding optical fiber core 304.

In this illustrative example, optical fibers 301 and 303 are brought together to form coupling region 300. Cladding 306 and cladding 308 are heated and partially melted to adhere to each other. In this example, cladding 306 and cladding 308 are heated at a temperature at which cladding 306 and cladding 308 are in a soft-solid phase. As depicted in this example, the cross section of coupling region 300 has substantially dumbbell shape 310 within glass capillary 312.

In this illustrative example, coupling region 300 has cladding 306 and cladding 308 located within glass capillary 312. Glass capillary 312 may have an inner hole (not shown) to allow optical fibers 301 and 303 to pass through along with the fiber jackets for these optical fibers. A vacuum is applied to glass capillary 312 such that the inner hole of glass capillary 312 collapses around dumbbell shape 310. In other words, glass capillary 312 takes form around dumbbell shape 310 as depicted in this illustrative example. In coupling region 300, these fiber jackets are stripped from the optical fibers before heating of the optical fibers to form coupling region 300. Glass capillary 312 increases the diameter of coupling region 300. This increase in the diameter allows coupling region 300 to resist breaking during bending of coupling region 300.

The different advantageous embodiments take into account and recognize that an increased diameter for the cross section of a coupling region provides increased strength for the coupling region. Further, an increased diameter helps the coupling region resist breaking when bending of the coupling region occurs. The different advantageous embodiments take into account and recognize that an optical switch that has an increased diameter for the cross section of the coupling region without the use of a glass capillary is desirable.

Figure 4:
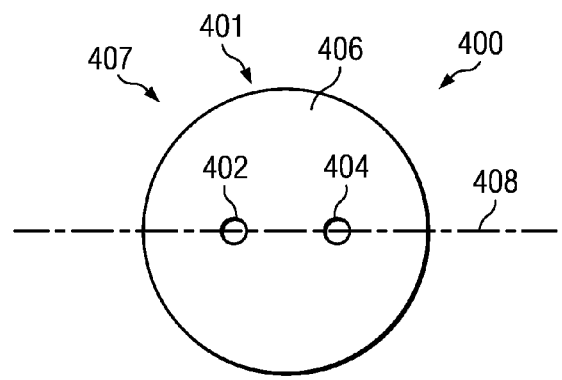
FIG. 4 is an illustration of a cross section of an optical coupler in a coupling region in which an advantageous embodiment may be implemented.

With reference now to FIG. 4, an illustration of a cross section of an optical coupler in a coupling region is depicted in accordance with an advantageous embodiment. In this illustrative example, coupling region 400 is depicted as cross section 401. Coupling region 400 has optical fiber core 402, optical fiber core 404, and cladding 406.

As depicted in this example, cladding 406 has substantially circular shape 407. In one illustrative example, a cladding for one optical fiber and a cladding for another optical fiber are positioned next to each other. In other words, these two optical fibers are positioned within a selected distance from each other or may physically touch each other. The claddings are heated such that the separate claddings form cladding 406 with substantially circular shape 407. In this example, this heating may occur at a temperature selected to form substantially circular shape 407 due to the surface tension of optical fibers 502 and 504, as depicted in the next figure, FIG. 5. The temperature needed to form substantially circular shape 407 for cladding 406 is greater than the temperature needed to form substantially dumbbell shape 310 in FIG. 3.

Further, cladding 406 with substantially circular shape 407 is formed with a diameter having a size that resists breaking during bending to couple light signals between optical fiber core 402 and optical fiber core 404. When the optical fibers for optical fiber cores 402 and 404 are heated at a temperature selected to form cladding 406 with substantially circular shape 407, the diameter of cladding 406 has a size that resists breaking during flexing of coupling region 400. The diameter for cladding 406 depends on the diameters for the cladding for the optical fibers for optical fiber core 402 and optical fiber core 404. In this manner, coupling region 400 has a substantially circular cross section that has a diameter with a size that provides resistance against breaking during bending of cladding 406 to couple light signals between optical fiber core 402 and optical fiber core 404.

In this illustrative example, flexing plane 408 contains optical fiber core 402 and optical fiber core 404. Thus, flexing plane 408 is oriented to allow a desired amount of coupling of light signals between these optical fiber cores. Bending of coupling region 400 in flexing plane 408 can cause a light signal to couple between optical fiber core 402 and optical fiber core 404. In other words, a light signal may be transferred from one optical fiber core to the other optical fiber core within coupling region 400 when bending occurs in flexing plane 408.

Further, bending of coupling region 400 in flexing plane 408 causes a greatest amount of coupling. Bending in a plane perpendicular to flexing plane 408 causes a least amount of coupling. In these examples, the amount of coupling that occurs may decrease as bending of coupling region 400 increases in a direction away from flexing plane 408 towards a plane perpendicular to flexing plane 408. In this manner, a desired amount of coupling of light signals may occur with bending of coupling region 400 within a selected tolerance from flexing plane 408. As one example, a desired amount of coupling may occur with bending of coupling region 400 in flexing plane 408 and within a few degrees from flexing plane 408.

Figure 5:
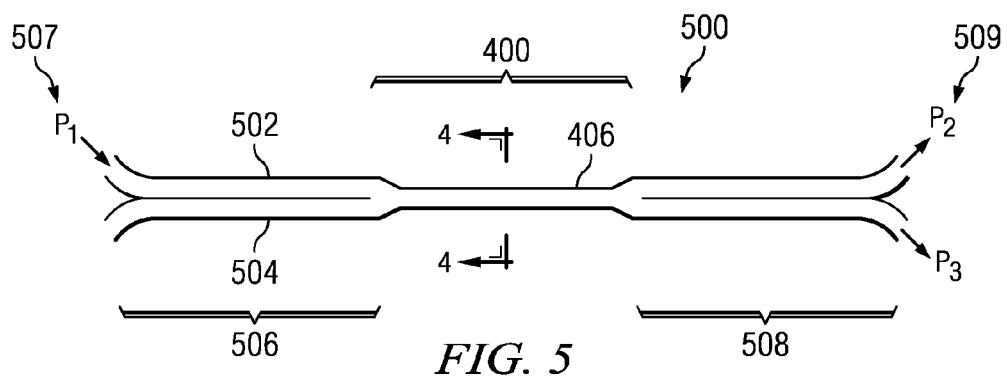
FIG. 5 is an illustration of an optical coupler in which an advantageous embodiment may be implemented.

Turning now to FIG. 5, an illustration of an optical coupler is depicted in accordance with an advantageous embodiment. In this illustrative example, optical coupler 500 is a 2×2 optical coupler. Optical coupler 500, in this example, has input 506 at end 507 and output 508 at end 509. Optical coupler 500 has coupling region 400 in FIG. 4. The illustration of coupling region 400 in FIG. 4 is taken along lines 4-4 in FIG. 5.

As depicted in this example, coupling region 400 is located between input 506 and output 508. In this example, optical coupler 500 has optical fiber 502 and optical fiber 504 at input 506. At input 506 and output 508, optical fibers 502 and 504 are separate optical fibers in proximity to each other. Thus, a light signal traveling in one of optical fibers 502 and 504 does not interact with a light signal traveling in another of optical fibers 502 and 504 at input 506 or output 508. In this illustrative example, this type of interaction of light signals occurs in coupling region 400.

Further, with optical fibers 502 and 504 being separate, physical bending of optical fibers 502 and 504 does not cause interaction between the light signals. In this example, optical fiber 502 has optical fiber core 402, and optical fiber 504 has optical fiber core 404 in FIG. 4.

In coupling region 400, optical fibers 502 and 504 merge to form one optical fiber with two optical fiber cores. In other words, optical fiber cores 402 and 404 of optical fibers 502 and 504, respectively, are coupled such that the optical fiber cores are both within cladding 406 within coupling region 400. Cladding 406 may be formed during heating and drawing of optical fibers 502 and 504 in this example. In other examples, this cladding may be formed in some other suitable manner.

Figure 6:
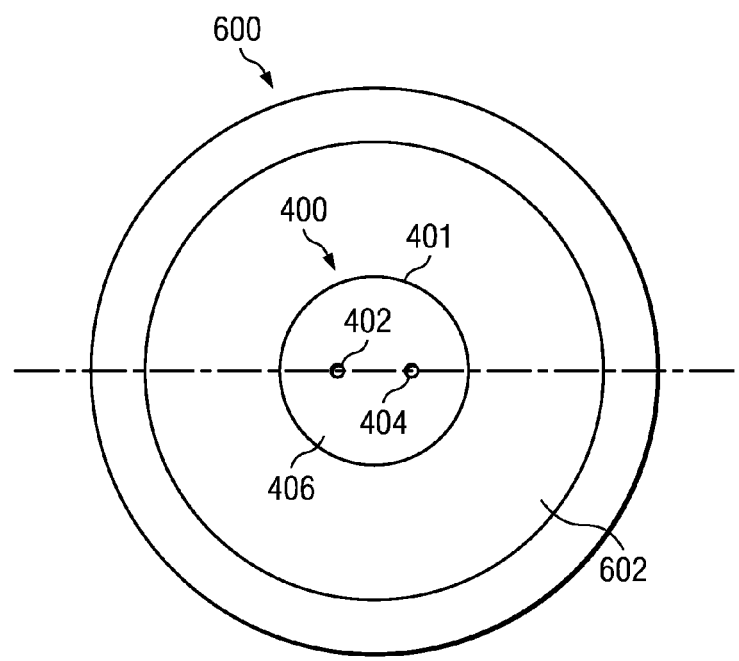
FIG. 6 is an illustration of a cross section of an optical coupler within a flexing member in which an advantageous embodiment may be implemented.

Turning now to FIG. 6, an illustration of a cross section of an optical coupler within a flexing member is depicted in accordance with an advantageous embodiment. In this illustrative example, flexing member 600 is shown in a cross-sectional view with cross section 401 of coupling region 400 in FIG. 4 within flexing member 600. Flexing member 600 is an example of one implementation for flexing member 126 in FIG. 1. As depicted, coupling region 400 is positioned in flexing member 600. Flexing member 600 is configured to bend in these illustrative examples. Flexing member 600 may bend in a manner that changes the degree of bending of coupling region 400. This bending allows light signals to couple between optical fiber cores 402 and 404.

In these examples, coupling region 400 is constrained by retaining material 602 such that coupling region 400 does not move substantially laterally within flexing member 600. Optical fiber core 402 and optical fiber core 404 are depicted within cladding 406.

Additionally, retaining material 602 holds coupling region 400 in a position within flexing member 600. Retaining material 602 may take various forms. Retaining material 602 may be, for example, without limitation, acrylate, a polymer, plastic, polycarbonate, and/or some other type of material. In these illustrative examples, retaining material 602 provides coupling region 400 with mechanical strength. Retaining material 602 may be any material soft and yet strong enough to reduce and/or avoid shifting when the optical fibers within coupling region 400 are bent.

Further, retaining material 602 may act as a protective buffer and reduce and/or prevent inconsistencies from occurring on cladding 406. These inconsistencies may include, for example, without limitation, micro-cracks, optical damage, and/or optical degradation.

Figure 7:
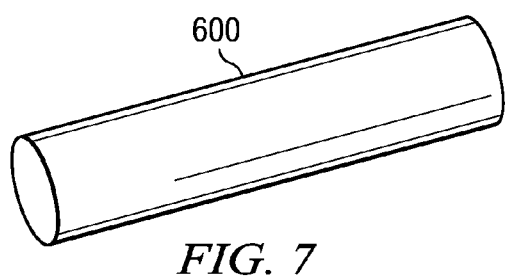
FIG. 7 is an illustration of an external perspective view of a flexing member in accordance with an advantageous embodiment.

Turning now to FIG. 7, an illustration of an external perspective view of a flexing member is depicted in accordance with an advantageous embodiment. In this illustrative example, flexing member 600 takes the form of a cylinder. In other advantageous embodiments, flexing member 600 may take some other suitable form.

Flexing member 600 may be constructed with a stiffness selected such that sagging of flexing member 600 in an undesired direction caused by the weight of flexing member 600 is substantially avoided or reduced. In other words, flexing member 600 is constructed such that little or no sagging of the cylindrical shape of flexing member 600 occurs. Sagging of flexing member 600 in an undesired direction may lead to a less than desired amount of coupling. For example, flexing member 600 may be constructed of a material with a strength that reduces and/or prevents sagging of flexing member 600 in an undesired direction. Further, flexing member 600 may take a shape that resists sagging that may be caused by the weight of flexing member 600. Depending on the implementation for flexing member 600, flexing member 600 may bend with external force.

Figure 8:
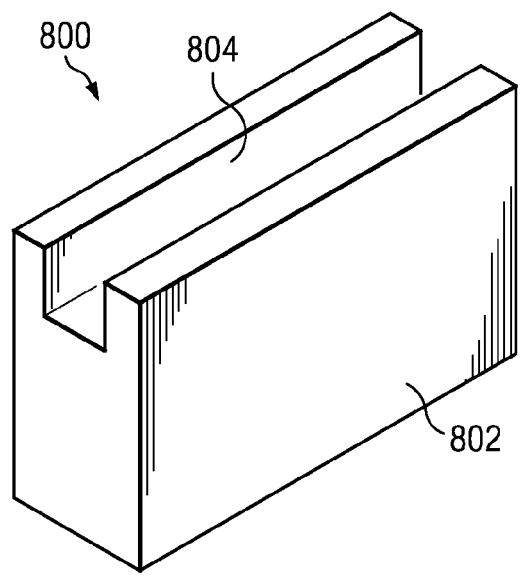
FIG. 8 is an illustration of an example of a flexing member in which an advantageous embodiment may be implemented.

Turning now to FIG. 8, an illustration of another example of a flexing member is depicted in accordance with an advantageous embodiment. In this illustrative example, flexing member 800 is an example of another implementation for flexing member 126 in FIG. 1. In this illustrative example, flexing member 800 takes the form of beam 802. Beam 802 has channel 804.

Figure 9:
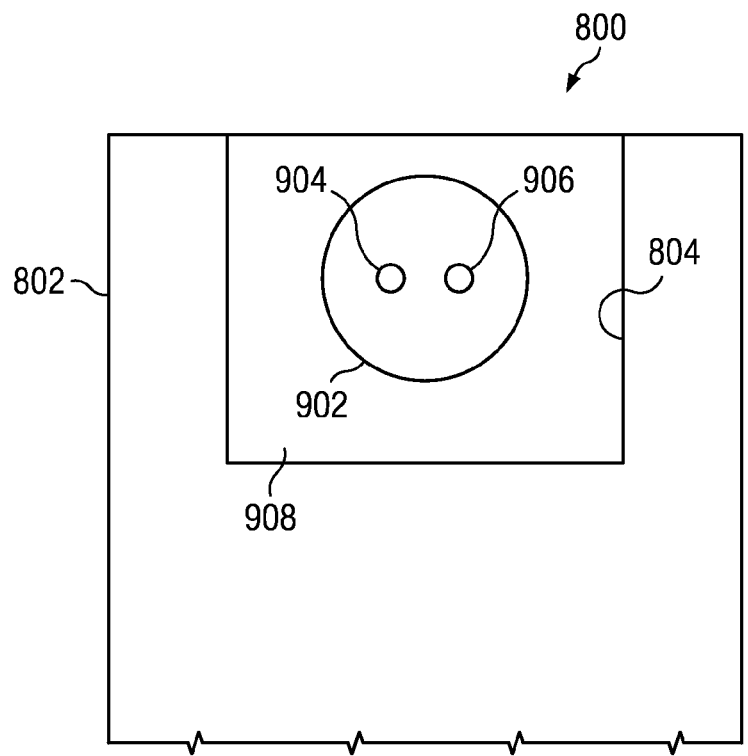
FIG. 9 is an illustration of a cross section of a coupling region within a flexing member in accordance with an advantageous embodiment.

Turning now to FIG. 9, an illustration of a cross-section of an optical coupler within flexing member 800 is depicted in accordance with an advantageous embodiment. In this example, cladding 902 with optical fiber cores 904 and 906 is located within channel 804 of beam 802 of flexing member 800. Cladding 902 and optical fiber cores 904 and 906 may be retained within flexing member 800 through the use of retaining material 908.

Flexing member 800 also may be flexible to allow movement of cladding 902 with optical fiber cores 904 and 906 to different positions to couple light signals between these optical fiber cores.

Flexing member 700 in FIG. 7 and flexing member 800 in FIGS. 8 and 9 are illustrated as examples of some implementations for flexing member 126 in FIG. 1. Other configurations may be present, depending on the particular implementation. For example, flexing member 800 does not need to be a single solid component. In some advantageous embodiments, flexing member 800 may be formed from a suitable combination of separate pieces joined together.

This type of flexing member is only an example of one implementation for flexing member 800. Flexing member 800 may have any of a number of shapes and may be manufactured using any of a number of processes that allow flexing member 800 to have a strength that resists bending of flexing member 800 that may be caused by the weight of flexing member 800. Further, flexing member 800 may be formed in a shape that allows flexing member 800 to bend in response to a force applied to flexing member 800.

Figure 10:
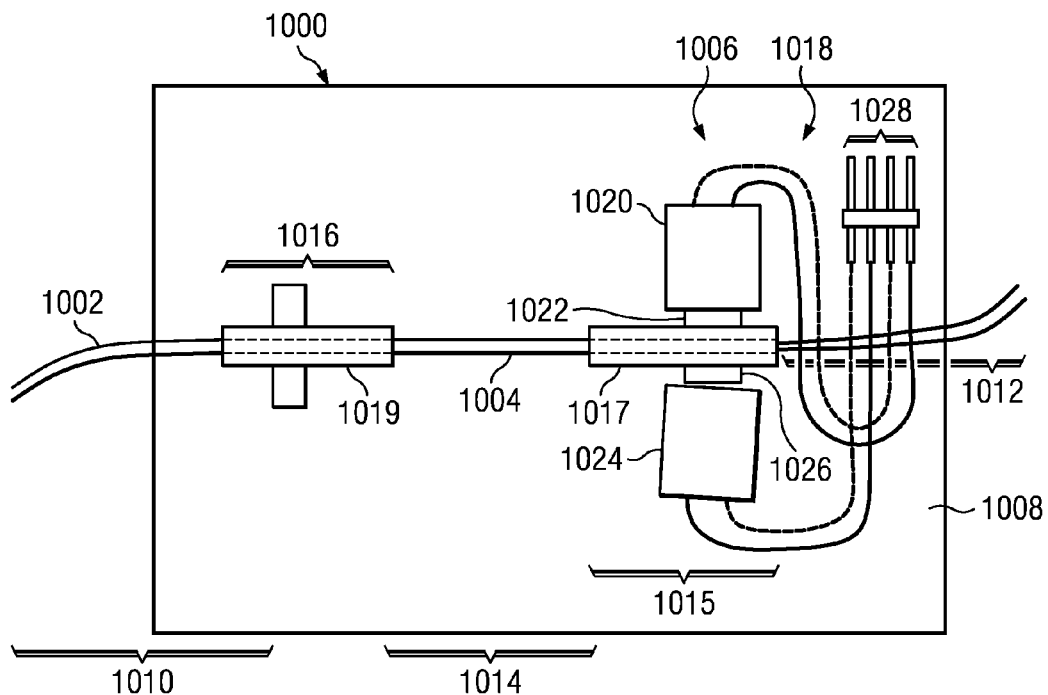
FIG. 10 is an illustration of an optical switch in which an advantageous embodiment may be implemented.

With reference now to FIG. 10, an illustration of an optical switch is depicted in accordance with an advantageous embodiment. In this illustrative example, optical switch 1000 is an example of one implementation of optical switch 122 in FIG. 1. In this illustrative example, optical switch 1000 includes optical fibers 1002, flexing member 1004, switching system 1006, and platform 1008. In this illustrative example, flexing member 1004 holds an optical coupler, such as optical coupler 500 in FIG. 5.

Platform 1008 may be a housing, a planar member, or some other suitable type of platform for optical switch 1000. In this illustrative example, optical fibers 1002 have two output fibers 1010, two input fibers 1012, and coupling region 1014. In this illustrative example, coupling region 1014 is located in flexing member 1004. Flexing member 1004 may take various forms such as, for example, without limitation, a tube, a beam, an elongate member, or some other shape.

Portion 1015 and portion 1016 are non-coupling portions of optical switch 1000. In this illustrative example, portions 1015 and 1016 each include a portion of optical fibers 1002. These portions of optical fibers 1002 are held in a substantially rigid position by rigid member 1017 and rigid member 1019, respectively. Rigid member 1017 and rigid member 1019 may have a diameter that is greater than the diameter of flexing member 1004 in this illustrative example. Rigid members 1017 and 1019 allow bending of flexing member 1004 to occur substantially over coupling region 1014, rather than over the entire length of the optical fibers. In some advantageous embodiments, rigid members 1017 and 1019 may not be needed. In such examples, portion 1015 and portion 1016 may bend without affecting coupling of light signals.

In this illustrative example, switching system 1006 takes the form of magnetic field generation system 1018. As depicted, magnetic field generation system 1018 includes coil 1020, permanent magnet 1022, coil 1024, and permanent magnet 1026. Coils 1020 and 1024 may be implemented in the form of solenoid coils with mechanical stops. Coils 1020 and 1024 may generate magnetic fields for magnetic field generation system 1018. In this illustrative example, magnetic field generation system 1018 is configured to generate magnetic fields to move flexing member 1004 between two positions. In this illustrative example, flexing member 1004 may move between these two positions determined by coils 1020 and 1024.

At one position, coil 1020 generates a magnetic field to pull permanent magnet 1022, and coil 1024 generates a magnetic field to push permanent magnet 1026. At this position, flexing member 1004 is stopped by mechanical contact with the mechanical stop of coil 1020 and attracted to coil 1020 by permanent magnet 1022. Flexing member 1004 remains attracted to coil 1020 until another electrical current moves flexing member 1004 to the second position.

At the second position, flexing member 1004 is stopped by mechanical contact with the mechanical stop of coil 1024 and attracted to coil 1024 by permanent magnet 1026. At this position, coil 1024 generates a magnetic field to pull permanent magnet 1026, and coil 1020 generates a magnetic field to push permanent magnet 1022. In this example, wires 1028 provide connections to coil 1020 and coil 1024 in magnetic field generation system 1018.

In this illustrative example, the magnetic fields generated by coils 1020 and 1024 may only be active during the operation of switching system 1006. When switching system 1006 is not in operation, permanent magnets 1022 and 1026 allow flexing member 1004 to remain in one of the two positions for flexing member 1004.

In this example, a change in the coupling of light signals may be caused by the flexing of coupling region 1014 through movement of flexing member 1004.

Figure 11:
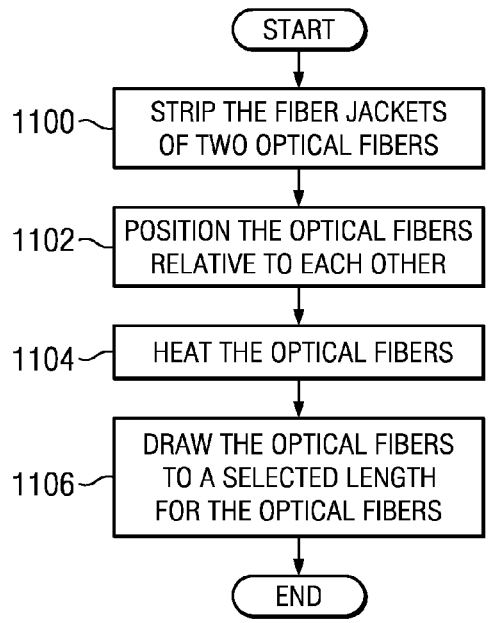
FIG. 11 is an illustration of a flowchart of a process for forming an optical coupler in accordance with an advantageous embodiment.

Turning now to FIG. 11, an illustration of a flowchart of a process for forming an optical coupler is depicted in accordance with an advantageous embodiment. The process illustrated in FIG. 11 may be used to create coupling region 134 for optical fibers 124 in FIG. 1.

The process begins by stripping the fiber jackets of two optical fibers (operation 1100). The optical fibers are then positioned relative to each other (operation 1102). For example, without limitation, a first optical fiber is positioned next to a second optical fiber. This positioning involves placing each of the optical fibers parallel to each other. When the optical fibers are polarization maintaining optical fibers, operation 1100 also involves aligning the polarizations of the two optical fibers.

The process then heats the optical fibers (operation 1104). The heating in operation 1104 is performed such that the claddings for the two optical fibers form a single cladding within the coupling region. Thereafter, the optical fibers are drawn to a selected length for the optical fibers (operation 1106). This length may be, for example, without limitation, around 1 to around 1.5 centimeters. In operation 1106, the optical fibers are drawn while the optical fibers are still softened from the heating in operation 1104. The process then terminates. The process illustrated in FIG. 11 is only an example of one implementation for the formation of a coupling region.

Figure 12:
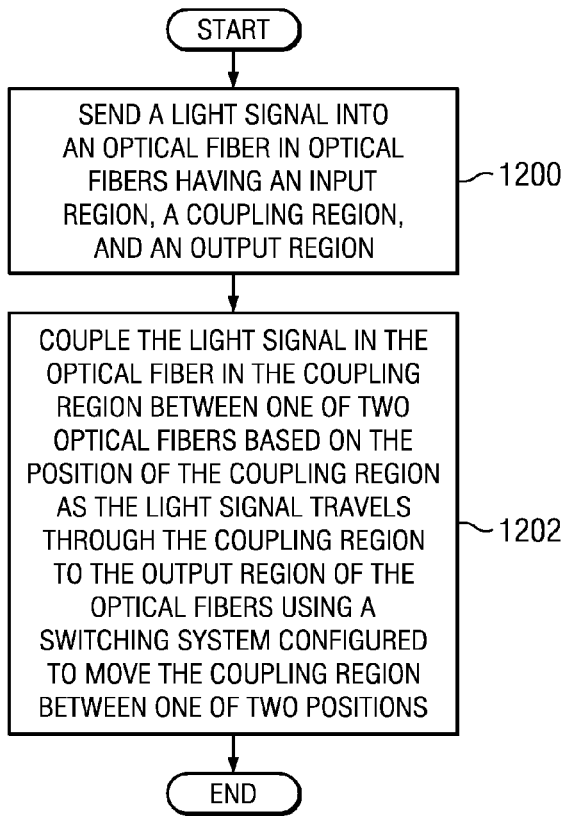
FIG. 12 is an illustration of a flowchart of a process for routing light signals in accordance with an advantageous embodiment.

Turning now to FIG. 12, an illustration of a flowchart of a process for routing light signals is depicted in accordance with an advantageous embodiment. The process illustrated in FIG. 12 may be implemented in light signal routing environment 100 in FIG. 1.

The process begins by sending a light signal into an optical fiber in optical fibers having an input region, a coupling region, and an output region (operation 1200). A length of the optical fibers in the coupling region has a common fiber cladding. The coupling region may be held in a flexing member. The configuration of the flexing member depends upon the particular implementation.

The process then couples the light signal in the optical fiber in the coupling region between one of two optical fibers based on the position of the coupling region as the light signal travels through the coupling region to the output region of the optical fibers using a switching system configured to move the coupling region between one of two positions (operation 1202), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures.

Thus, the different advantageous embodiments provide a method and apparatus for switching light signals. As described in one advantageous embodiment, an apparatus may include an optical coupler, a first optical fiber and a second optical fiber, and a switching system. The optical fibers in the optical coupler may have an output region, an input region, and a coupling region. The coupling region is located between the output region and the input region.

A length of the first and second optical fibers in the coupling region has a common fiber cladding. A switching system is configured to move the coupling region in a manner that causes a light signal entering an optical fiber in the input region of the optical coupler to couple to one of the first and second optical fibers based on the position of the coupling region as the light signal travels through the coupling region to the output region of the optical coupler.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a flexing member having sufficient strength so that sagging of the flexing member under a weight of the flexing member is substantially avoided;
    an optical coupler disposed inside the flexing member, the optical coupler comprising:
        an output region on a first side of an optical fiber;
        an input region on a second side of the optical fiber, opposite the first side;
        a coupling region between the output region and the input region, wherein optical fiber cores in the coupling region are located in a single cladding having a substantially circular cross section, wherein the optical fiber cores are all selected distances from each other, and wherein the single cladding substantially fills spaces between the optical fiber cores within the selected distances; and
        a retaining material surrounding and constraining the coupling region such that the coupling region does not move substantially laterally within the flexing member, and holds the coupling region in a position within the flexing member;
    a switching system configured to move the coupling region in a manner that causes a light signal entering a first optical fiber core to couple between the first optical fiber core and a second optical fiber core in the coupling region based on a position of the coupling region as the light signal travels through the coupling region to the output region, and wherein the first optical fiber core and the second optical fiber core both are among the optical fiber cores.

2. The apparatus of claim 1, wherein the optical fiber cores consists of only the first optical fiber core and the second optical fiber core.

3. The apparatus of claim 2, wherein the light signal enters the input region through the first optical fiber core, the light signal travels through the coupling region and through the output region in the first optical fiber core when the flexing member is in a first position, and the light signal couples to the second optical fiber core from the first optical fiber core in the coupling region to travel through the output region in the second optical fiber core when the flexing member is in a second position.

4. The apparatus of claim 1, wherein the flexing member comprises:
    a beam with a channel, wherein the coupling region of the optical coupler is retained in the channel.

5. The apparatus of claim 1, wherein the retaining material is selected from one of acrylate, plastic, and polycarbonate.

6. The apparatus of claim 1, wherein the flexing member comprises:
a tube, wherein the coupling region of the optical coupler is retained in the tube with a retaining material.

7. The apparatus of claim 6, wherein the retaining material is selected from one of acrylate, plastic, and polycarbonate.

8. The apparatus of claim 1, wherein the flexing member positions the coupling region of the optical coupler to bend along a flexing plane in response to movement of the flexing member.

9. The apparatus of claim 1, wherein the flexing member is configured to be moved between a first position and a second position by a magnetic field and wherein the switching system comprises:
a magnetic field generation unit, wherein the magnetic field generation unit generates the magnetic field to move the flexing member between the first position and the second position.

10. The apparatus of claim 9, wherein the flexing member has a number of permanent magnets.

11. The apparatus of claim 9, wherein the magnetic field generation unit comprises:
a first coil; and
a second coil, wherein the first coil and the second coil generate the magnetic field to move the flexing member between the first position and the second position.

12. The apparatus of claim 9, wherein the magnetic field generation unit has a number of permanent magnets configured to move the flexing member between the first position and the second position.

13. The apparatus of claim 1 further comprising:
a first rigid member, wherein at least a portion of the input region is held by the first rigid member; and
a second rigid member, wherein at least a portion of the output region is held by the second rigid member.

14. The apparatus of claim 1, wherein the optical coupler is a 2×2 optical coupler.

15. The apparatus of claim 1, wherein the optical coupler and the switching system form an optical switch further comprising:
a network, wherein the optical switch switches a light signal in the network.

16. An optical switch comprising:
an optical coupler having an output region, an input region, a coupling region between the output region and the input region, and a retaining material surrounding and constraining the coupling region such that the coupling region does not move substantially laterally within the flexing member, and holds the coupling region in a position within the flexing member, wherein a first optical fiber core and a second optical fiber core in the coupling region are located in a single cladding having a substantially circular cross section, wherein the first optical fiber core and the second optical fiber core are at a selected distance from each other, and wherein the single cladding substantially fills a space between the first optical fiber core and the second optical fiber core;
a magnetic field generation unit configured to move the coupling region in a manner that causes a light signal entering one of the first optical fiber core and the second optical fiber core in the optical coupler in the input region to couple to the other of the first optical fiber core and the second optical fiber core in the optical coupler based on a position of the coupling region as the light signal travels through the coupling region to the output region of the optical coupler; and
a flexing member configured to hold the retaining material within the flexing member, wherein the magnetic field generation unit has a number of permanent magnets configured to move the flexing member between a first position and a second position by the magnetic field.

17. The optical switch of claim 16, wherein the magnetic field generation unit comprises:
a first coil; and
a second coil, wherein the first coil and the second coil generate the magnetic field to move the flexing member between the first position and the second position.

18. The optical switch of claim 16, wherein the magnetic field generation unit has a number of permanent magnets configured to move the flexing member between the first position and the second position.

19. A method for routing light signals, the method comprising:
sending a light signal into a first optical fiber core in an optical coupler having an input region, a coupling region, an output region, a retaining material surrounding and constraining the coupling region such that the coupling region does not move substantially laterally within the flexing member, and holds the coupling region in a position within the flexing member, wherein the optical coupler is further constrained within a flexing member, wherein the first optical fiber core is located in a single cladding having a substantially circular cross section, wherein the coupling region is located within the flexing member, wherein the first optical fiber core and the second optical fiber core are at a selected distance from each other, and wherein the single cladding substantially fills a space between the first and the second optical fiber core; and
coupling the light signal in the first optical fiber core between the first optical fiber core and one of the first optical fiber core and a second optical fiber core in the coupling region of the optical coupler based on a position of the coupling region as the light signal travels through the coupling region to the output region of the optical coupler using a switching system configured to move the coupling region between one of a first position and a second position, wherein the switching system moves the flexing member to move the coupling region of the optical coupler between the one of the first position and the second position, and wherein coupling further includes:
coupling the light signal in the coupling region to the first optical fiber core in the optical coupler when the flexing member is in the first position; and
coupling the light signal to the second optical fiber core in the optical coupler from the first optical fiber core in the coupling region when the flexing member is in the second position.

20. The method of claim 19 further comprising:
prior to sending the light signal, forming the coupling region by:
stripping fiber jackets of first optical fiber core and the second optical fiber core, wherein the first optical fiber core includes a first cladding and the second optical fiber core includes a second cladding;
positioning the first optical fiber core and the second optical fiber core at the selected distance; and
heating the coupling region such that the first cladding and the second cladding merge into a single cladding within the coupling region.

* * * * *